Aug. 22, 1933. J. F. DAILEY 1,923,191
COMBINED AUTOMATIC REFRIGERATOR AND MILK BOX
Filed May 17, 1929   2 Sheets-Sheet 1

Inventor
John F. Dailey
By *Eric J. Schinger* Attorney

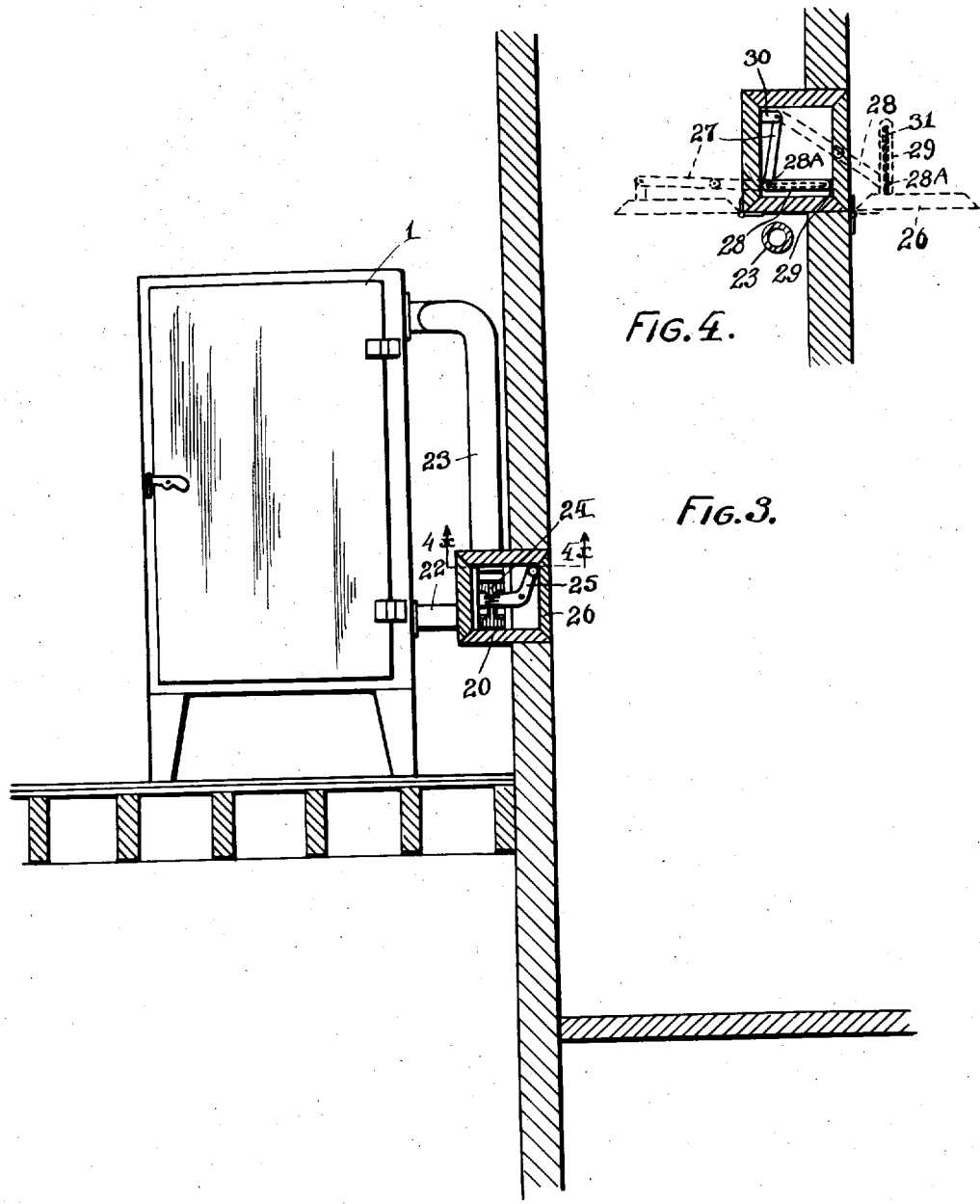

Patented Aug. 22, 1933

1,923,191

UNITED STATES PATENT OFFICE 1,923,191

COMBINED AUTOMATIC REFRIGERATOR AND MILK BOX

John F. Dailey, Rochester, N. Y.

Application May 17, 1929. Serial No. 363,874

5 Claims. (Cl. 62—65)

This invention relates to automatic refrigerators and has for its various objects:

To provide such a refrigerator with a separate compartment which is adapted to take the place of the milk box and is so constructed that it can be opened from the outside of the house so that the milk, meat or groceries may be placed from the outside of the house directly into the compartment forming part of the refrigerator which is located within the house, preferably in the kitchen thereof.

To provide this compartment with means whereby the cooled air within the refrigerator is automatically shut off from circulating in a separate compartment as soon as the door leading into the compartment from the outside of the house is opened or is accidentally left open.

All these and other objects of this invention will be apparent from the accompanying drawings, the specification and the appended claims forming a part thereof.

In the accompanying drawings:

Figure 3 is a sectional view of the compartment mounted in the wall of the house as a unit separate from the refrigerator but connected with it by a suitable piping system by means of which the inside of the compartment may be kept at practically the same temperature as the refrigerator proper.

Figure 4 is a horizontal sectional view thru the milk box, the section being taken on the line 4x—4x of Figure 3 as viewed in the direction of the arrows.

In the several figures of the drawings, like reference numerals indicate like parts.

Figures 1, 2:
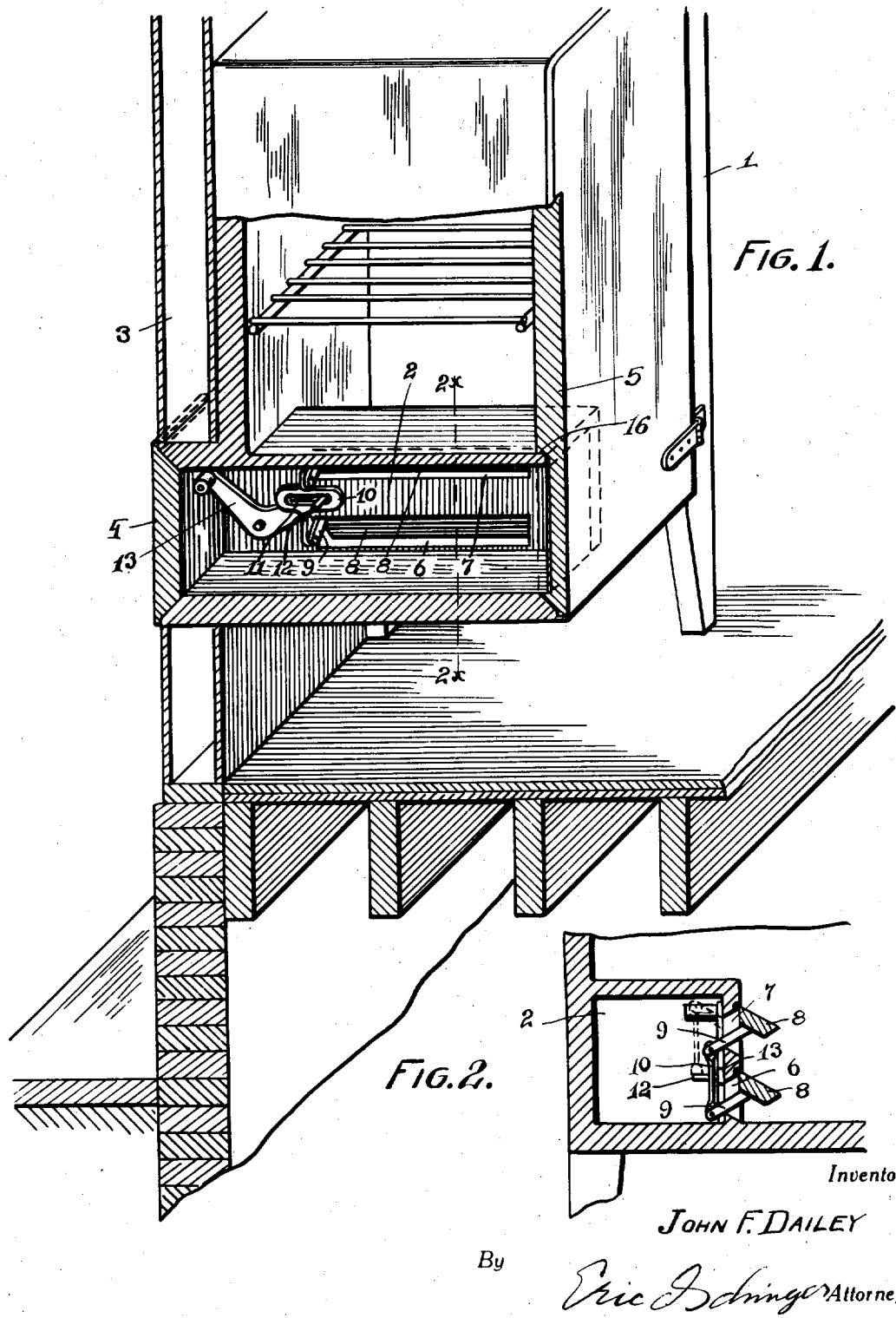
Figure 1 is a partial perspective and sectional view of the refrigerator embodying the separate compartment arranged as the "milk box" which may be opened from the outside of the house in order to have the milk, meat, groceries or other perishable goods placed into it.
Figure 2 is a vertical sectional view of the compartment illustrating the shutters for opening and closing the ducts leading from the refrigerator into the separate compartment.

The milk box with which practically every house is provided is very convenient for the purpose of receiving the milk, meat or groceries from those who deliver them, especially during the early morning hours when no one is up to receive them or during the day when every one is absent from the house. There is however one great drawback in the use of such a box and that is that perishable goods left in the box will perish when left therein too long. Furthermore milk or other liquid food even when left in a cooled state will soon get warm and possibly turn sour. In my present invention the milk box is incorporated as part of the automatic refrigerator so that everything placed into it will be kept in the same cooled state in which it is received or will be cooled to the temperature within the refrigerator when left therein a reasonable length of time.

As illustrated in Figure 1 the automatic refrigerator 1, which may be any one of the different types of refrigerators which are automatically cooled and kept uniformly cool by suitable cooling apparatus, is provided with the compartment 2 preferably at one of the lower corners thereof. This compartment extends from the rear of the refrigerator thru the wall 3 of the house so that the door 4 closing the end of the compartment 2 is located on the outside of the house and may be opened and closed at will from the outside of the house. The inner end of the compartment 2 preferably extends into a pocket provided in the door 5 of the refrigerator so that when the door 5 is closed, it seals the inner end of the compartment from the inside of the refrigerator.

The inside of the compartment 2 is cooled and kept cool by the circulation of the air entering the elongated opening or duct 6 in the inner side of the compartment near the bottom of it and leaving the compartment thru the elongated opening or duct 7 in the same side of the compartment near the top of it. Both of these openings are provided with shutters 8, 8 which are hinged to swing on the outside of the compartment to open and close the openings 6 and 7 for a purpose that will presently appear.

Each of the shutters 8 and 8 is provided with an arm 9 which extends into the compartment and is connected therein by the link 10. In the link 10 is provided the slot 11 thru which projects the pin 12 carried at the inner end of the bell crank lever 13. The bell crank lever is mounted to swing on the inside of the compartment and its outer end is suitably weighted. When therefore the door 4 of the compartment is opened the weighted end of the bell crank lever is released and swings outwardly thereby rocking the bell crank so that the pin 12 carried on the inner end of the lever raises the link 10. This in turn moves the arm 9 of the shutters upwardly and swings the shutters down to close the openings in the side of the compartment.

In this way the openings 6 and 7 are opened by the shutters when the door 4 is closed and allows free circulation of air from the inside of the refrigerator thru the milk compartment to keep the compartment at the same temperature as the refrigerator. As soon, however, as the door is opened the openings or ducts are closed by the shutters so that the inside of the refrigerator is no longer connected with the inside of the compartment and warm air entering the compartment from the outside cannot enter into the refrigerator proper. This is important for several reasons. First because those who deliver milk, groceries etc. are often careless and leave the door of the milk box open after they have placed the goods in it, in which case a considerable amount of warm air could enter the refrigerator through the milk compartment before it would be noticed that the door had been left open. Second because the opening leading into the milk compartment is located on the outside of the house where the temperature of the air, especially in the summer time, is considerably higher than the air within the house where the refrigerator is located and to open the refrigerator to the outside of the house thru the milk compartment 2 would allow the warm air entering the refrigerator thru the compartment to raise the temperature within the refrigerator considerably faster and make the cooling apparatus of the refrigerator operate considerably longer in order to cool the warm air admitted into it thru the compartment even after the door of the compartment has been closed. Another reason for providing the compartment as a practically separate unit within the refrigerator is to prevent those who fill the compartment from reaching into the refrigerator proper and taking some or all of the contents of the refrigerator. With the separate compartment they are only admitted into this particular compartment in order to allow them to deliver their goods.

With the automatic separation of the milk box compartment from the refrigerator proper a more even temperature within the refrigerator proper is maintained as none of the cooled air is drained from it when opening the milk box compartment.

With the construction of the automatically operated shutters the openings in the side of the compartment leading into the refrigerator proper are closed as soon as the door closing the outer end of the compartment is opened, and the openings in the compartment will stay closed until the door of the compartment is again closed. In this way only the compartment 2 is warmed up by the outside air that enters it thru the door 4 and as the volume of air within this compartment is small, it is quickly cooled as soon as the door is closed and the openings leading into the refrigerator are opened.

The outer end of the bell crank lever is shown weighted and rests against the inside of the door. When therefore the door is opened the weight rocks the lever and closes the shutters, as above described, and keeps the shutters closed while the door of the compartment is kept open for the purpose of inserting the milk bottles, meat or groceries. When the door is closed the weighted end of the bell crank lever is raised and is pushed back into the compartment. This rocks the lever so that as soon as the door is closed the shutters are opened and the circulation of the air between the refrigerator proper and the compartment can commence and keep the milk or groceries at a temperature in which they cannot spoil. Should, however, the door of the compartment accidentally be left open, the shutters will not open into the refrigerators so that only the temperature of the compartment will rise without affecting the temperature of the inside of the refrigerator.

In order to insure a perfect seal between the door of the refrigerator and the inner end of the compartment, the door is provided with a pocket 16 into which the compartment extends while the door is closed. Of course in opening the door of the refrigerator the inner end of the compartment is also opened so that the articles within the compartment can be withdrawn from it just as if they had been located in the refrigerator itself.

In Figure 3, I have shown the compartment as a separate unit located in the wall of the house as is the case with the ordinary milk box in use to-day. This compartment is of course properly insulated similar to that of a refrigerator. The compartment is connected with the refrigerator by means of the pipes 22 and 23 which lead from the lower portion of the refrigerator into the lower part of the compartment 20 and out thru the upper part of the compartment into the upper part of the refrigerator. The inlet and outlet from the pipes are controlled by the slide valve 24 which is mounted to slide on the side of the compartment to cover or uncover the openings leading from the pipes into the compartment. The slide valve is connected to the bell crank 25, the outer end of which is weighted and rests against the inside of the door 26 of the compartment. As soon as the door is opened the bell crank lever is released and swings out, thus moving the slide valve upwardly to close the openings in the side of the compartment. This action shuts off the circulation of the air between the refrigerator and the compartment and keeps it shut off until the door is closed again. The compartment 20 is thus cooled in the same way as the compartment forming part of the refrigerator, above described, and the circulation between the separate compartment and the refrigerator is controlled in practically the same way so that in both cases with very little additional cost the compartment can be kept cool by the cooling apparatus of the refrigerator.

In the winter time when the temperature is lower on the outside of the house, the automatic separation of the milk box compartment from the refrigerator proper serves an equally important service, namely it prevents the cold atmosphere from entering the refrigerator proper thru the milk box compartment. Without this automatic separation the cold atmosphere would enter the refrigerator thru the milk box compartment if its door is left open and the cold would destroy the contents of the refrigerator by freezing it.

As illustrated in Figure 4 the outer and inner doors of the milk box are connected together on the inside by means of a series of links 27 and 28. Link 27 is pivoted with one end to the lug 30 carried on the inside of the inner door of the milk box. With the other end the link 27 is pivotally connected to the link 28 which in turn is connected to the slotted bracket 29 mounted to the inside of the outer door 26. In the slot of the slotted bracket 29 is suitably mounted an expansion spring 31 which normally holds the pivot pin 28 A, carried at the end of the link, at the inner end of the slot of the bracket. When the outer door is opened the unfolding of the links from the full line position into the dotted line position thus pulls the inner door shut and after it is shut a suitable latch mechanism (not shown) will keep it shut. In this way any one opening the outer door of the milk box will automatically close the inner door if it had been left open. This prevents any one from reaching thru the milk box from the outside. It will also shut the inside door and prevent the admission of warm air into the refrigerator thru the inside door if it has been accidentally left open.

Just as opening the outside door will close the inside door so will the opening of the inside door close the outside door thru the same link mechanism as illustrated in dotted lines in Figure 4. When the links 27 and 28 move into the position illustrated at the right in Figure 4, the pivot pin 28 A located in the slotted bracket 29 compresses the spring 31 in order to allow the door to fully open.

I claim:

1. In combination with a refrigerator, of a compartment insulated from the refrigerator, a door at each end of said compartment a passage leading into said compartment from said refrigerator, a passage leading out of said compartment into said refrigerator, means for simultaneously closing said passages, and means operated on the opening of said door to close said passages and keep said passages closed while said door is open, said means operating to open said passages on the closing of said door.

2. In combination with a refrigerator having a door, of a compartment located within said refrigerator, a second door at one end of said compartment to close one end of said compartment and the door of the refrigerator closing the other end of said compartment, a pair of passages leading into said compartment from the inside of said refrigerator and means operated by said second door on the outside of said compartment to close said pair of passages on the opening of said second door and open said passage on the closing of said door.

3. In combination with a refrigerator having a door, of a compartment partially located within and partially without said refrigerator, a door on the outside of said compartment to close the outer end thereof, the inner end of said compartment located within said refrigerator, said refrigerator door sealing the inner open end of said compartment on the inside of said refrigerator, a pair of passages leading from said refrigerator into said compartment, a shutter for opening and closing each of said passages, means operated on the opening of said compartment door to swing said shutters to close said passages, said means also operating to swing said shutters to open said passages on the closing of said compartment door.

4. In a combined refrigerator and milk box compartment having an inner and an outer door the combination of means for connecting the inside of the refrigerator with the inside of the milk box compartment to permit free circulation between the refrigerator and the milk box compartment, means for automatically shutting off the circulation between said refrigerator and said milk box compartment on the opening of one of the doors leading into said milk box compartment and means for closing one of the doors leading into the milk box compartment when the other door is opened.

5. In combination with a refrigerator of a compartment associated with said refrigerator, a pair of doors for said compartment, passages leading into and out of said compartment into said refrigerator and means operated on the opening of one of said doors to close said passages and operated on the closing of said door to open said passages.

JOHN F. DAILEY.